(12) United States Patent
Kaabouch et al.

(10) Patent No.: US 7,984,301 B2
(45) Date of Patent: Jul. 19, 2011

(54) BI-PROCESSOR ARCHITECTURE FOR SECURE SYSTEMS

(75) Inventors: Majid Kaabouch, Rousset (FR); Eric Le Cocquen, Saint Maximin la Sainte Beaume (FR)

(73) Assignee: Inside Contactless S.A., Aix-en-Provence (FR)

( * ) Notice: Subject to any disclaimer, the term of this patent is extended or adjusted under 35 U.S.C. 154(b) by 883 days.

(21) Appl. No.: 11/558,367

(22) Filed: Nov. 9, 2006

(65) Prior Publication Data

US 2008/0072051 A1   Mar. 20, 2008

Related U.S. Application Data

(60) Provisional application No. 60/822,735, filed on Aug. 17, 2006.

(51) Int. Cl.
*H04L 9/32* (2006.01)
*H04L 9/00* (2006.01)

(52) U.S. Cl. ........................................................ 713/176
(58) Field of Classification Search .................... 713/176
See application file for complete search history.

(56) References Cited

U.S. PATENT DOCUMENTS

| | | | |
|---|---|---|---|
| 5,093,780 A | 3/1992 | Sunahara | |
| 5,896,499 A * | 4/1999 | McKelvey | 726/11 |
| 5,991,519 A | 11/1999 | Benhammou et al. | |
| 6,032,248 A | 2/2000 | Curry et al. | |
| 6,061,449 A | 5/2000 | Candelore et al. | |
| 6,094,724 A | 7/2000 | Benhammou et al. | |
| 6,226,749 B1 | 5/2001 | Carloganu et al. | |
| 6,278,783 B1 | 8/2001 | Kocher et al. | |
| 6,295,606 B1 | 9/2001 | Messerges et al. | |
| 6,298,442 B1 | 10/2001 | Kocher et al. | |
| 6,304,658 B1 | 10/2001 | Kocher et al. | |
| 6,327,661 B1 | 12/2001 | Kocher et al. | |
| 6,331,784 B1 | 12/2001 | Mason et al. | |
| 6,381,699 B2 | 4/2002 | Kocher et al. | |
| 6,404,217 B1 | 6/2002 | Gordon | |
| 6,510,518 B1 | 1/2003 | Jaffe et al. | |
| 6,539,092 B1 | 3/2003 | Kocher | |
| 6,654,884 B2 | 11/2003 | Jaffe et al. | |

(Continued)

FOREIGN PATENT DOCUMENTS

CA   2333095   5/2005

(Continued)

OTHER PUBLICATIONS

Atmel Security Applications "Limiting Illegal Hardware Copies by Using Secure Hardware Authentication" http://www.atmel.com/dyn/products/other-docs.asp?family_id=662, Updated Feb. 2005, pp. 24-26.

(Continued)

*Primary Examiner* — Kambiz Zand
*Assistant Examiner* — Aubrey H Wyszynski
(74) *Attorney, Agent, or Firm* — Fish & Richardson P.C.

(57) ABSTRACT

Systems, methods and program products for a first central processing unit (CPU) configured to perform tasks that do not require manipulation of sensitive information and a second CPU that is configured to perform tasks that manipulate the sensitive information on behalf of the first CPU. The first CPU and the second CPU can communicate through a secure interface. The first CPU cannot access the sensitive information within the second CPU.

20 Claims, 4 Drawing Sheets

U.S. PATENT DOCUMENTS

| | | | |
|---|---|---|---|
| 7,073,069 B1 * | 7/2006 | Wasson et al. | 713/189 |
| 7,233,977 B2 | 6/2007 | Gupta et al. | |
| 7,278,031 B1 * | 10/2007 | Best | 713/193 |
| 2002/0124178 A1 | 9/2002 | Kocher et al. | |
| 2003/0044003 A1 | 3/2003 | Chari et al. | |
| 2003/0091191 A1 | 5/2003 | Watanabe et al. | |
| 2003/0093684 A1 | 5/2003 | Kaiserwerth et al. | |
| 2004/0139322 A1 * | 7/2004 | Kaler et al. | 713/170 |
| 2005/0271202 A1 | 12/2005 | Shu et al. | |
| 2005/0273630 A1 | 12/2005 | Shu et al. | |
| 2005/0273631 A1 | 12/2005 | Shu et al. | |
| 2006/0045264 A1 | 3/2006 | Kocher et al. | |
| 2006/0075254 A1 | 4/2006 | Henniger | |
| 2006/0123152 A1 | 6/2006 | Koch et al. | |
| 2006/0129848 A1 * | 6/2006 | Paksoy et al. | 713/193 |
| 2007/0056042 A1 | 3/2007 | Qawami et al. | |

FOREIGN PATENT DOCUMENTS

| | | |
|---|---|---|
| EP | 0747803 | 12/1996 |
| EP | 1677193 | 7/2006 |
| GB | 221 610 A | 9/1924 |
| WO | WO 2007/094857 | 8/2007 |

OTHER PUBLICATIONS

Atmel Secure Products, www.atmel.com/dyn/resources/prod-documents/doc.6523.pdf, 2005, 20 pages.

Atmel "Security with Atmel—Hard to Crack" www.atmel.com/dyn/resources/prod-documents/doc1596.pdf, Sep. 2005, 2 pages.

Atmel "AT91SC Family High Performance Secure Cryptocontrollers" www.atmel.com/dyn/resources/prod-documents/doc_1593.pdf, Sep. 2005, 2 pages.

Atmel "Development Support AT90SC and AT91SC Families" www.atmel.com/dyn/resources/prod-documents/doc1599.pdf, Sep. 2005, 2 pages.

Nagravision "Technology Series—White Paper STB Security" www.nagravision.com/pdf/NV_TechServics_STBsecurity.pdf, 2005, 8 pages.

Anderson et al., "Cryptographic Processors—A Survey," Proceedings of the IEE IEEE USA, vol. 94, No. 2 , Feb. 2006, pp. 357-369, XP002480357.

Dhem et al. "Hardware and Software Symbiosis Helps Smart Card Evolution" IEEE MICRO IEEE USA, vol. 21, No. 6, Nov. 2001, pp. 14-25, XP002480355.

International Search Report and Written Opinion mailed Jun. 3, 2008 from corresponding International Application No. PCT/US2007/075933.

Ravi et al., "Tamper Resistance Mechanisms for Secure Embedded Systems" Proceedings, 17$^{th}$ International Conference on VLSI Design IEEE Comput. Soc Los Alamitos, CA USA 2004, pp. 605-611, XP002480356.

U.S. Appl. No. 12/236,434, filed Sep. 23, 2008, Kaabouch et al.

Atmel "Secure Microcontrollers for Smart Cards AT90SC9616RC" Rev. (Jan. 2003), 4 pages.

* cited by examiner

BI-PROCESSOR ARCHITECTURE FOR SECURE SYSTEMS

CROSS-REFERENCE TO RELATED APPLICATIONS

This application claims priority to U.S. Patent Application No. 60/822,735, entitled BI-PROCESSOR ARCHITECTURE FOR SECURE SYSTEMS, to Majid Kaabouch, et al., which was filed on Aug. 17, 2006. The disclosure of the above application is incorporated herein by reference in its entirety.

BACKGROUND

The present disclosure relates to protection schemes to prevent access to information stored in electrical circuits.

Secure integrated circuit cards, commonly referred to as smart cards, may be of the form of an embedded integrated circuit hardware device that is small enough to fit into a user's pocket. Smart cards may be used in many situations where sensitive information must be stored and shared. For example, set-top boxes that facilitate pay-per-view or video-on-demand features may use a smart card to supply user account information to a provider along with a request for access to such features, and to subsequently decrypt encrypted digital video streams that may be provided in response to the request. As another example, a Subscriber Identity Module (SIM) card in a Global Systems for Mobile Communications (GSM) phone may be used to store a user's personal information, such as his or her phone book, device preferences, preferred network(s), saved text or voice messages and service provider information. A SIM card may allow a user, for example, to change handsets while retaining all of his or her information on the SIM card. Smart cards may be used in a variety of applications (e.g., electronic payment systems, including specialized auto-debit devices such as public transportation cards and personal identification documents, such as passports, drivers licenses, and medical identification cards).

Due to security concerns, encryption standards or algorithms may be used to protect sensitive information on a smart card. For example, the Digital Encryption Standard (DES) may be used to encrypt information with a 56-bit key. Access to private data may only be available to a holder of the key. Newer updates to this standard, such as Triple-DES and Advanced Encryption Standard (AES) may offer an even more complex (and secure) encryption key algorithm. Another example standard is RSA (an acronym derived from the surnames of its three creators—Rivest, Shamir and Adleman), a publickey encryption standard with private-key decryption. Because of the value of information that may be stored on and protected by a smart card, hackers may employ various techniques to break or bypass various encryption algorithms used to protect sensitive information on a smart card. These techniques may generally be categorized as invasive attacks and non-invasive attacks.

For example, a hacker may grind off a portion of the smart card packaging in order to access internal signals and bypass security measures that may be in place. As another example, a hacker may subject the smart card to various kinds of radiation (e.g., laser light directed to exposed internal circuits or x-ray or gamma radiation directed through packaging) in an attempt to corrupt protected data. In some implementations, corruption of protected data at certain locations in the device can cause the device to bypass security measures (e.g., encryption algorithms) or to yield information to the hacker regarding device architecture or the protected data itself.

Smart cards can also be subject to attacks such as code reverse engineering. In a reverse engineering attack, the goal of a hacker is to study embedded instructions and data (or "code") in the smart card memory in order to clone the smart card functionality on an easily available programming device. Hardware countermeasures such as memory encryption and implanted read-only memories (ROMs) are commonly implemented on secure microcontrollers to prevent such code reverse engineering. However, the smart card's central processing unit (CPU) typically has unencrypted access to the entire program memory contents and can be manipulated to output the entire contents of memory. Once sensitive information has been extracted from a device, the information can be used for various nefarious purposes. For example, a hacker can obtain pay-per-view or video-on-demand services using another user's account; the hacker can access telecommunication services that are billed to another user; the hacker can steal another user's bank account funds; the hacker can steal another's identity; etc.

SUMMARY

In general, one aspect of the subject matter described in this specification can be embodied in a system that includes a first central processing unit (CPU) configured to perform tasks that do not require manipulation of sensitive information. A second CPU is configured to perform tasks that manipulate the sensitive information on behalf of the first CPU. The first CPU and the second CPU can communicate through a secure interface. And the first CPU cannot access the sensitive information within the second CPU.

These and other embodiments can optionally include one or more of the following features. The second CPU includes one or more of: a separate power source from the first CPU, a separate clock system from the first CPU, a separate program and data memory from the first CPU, dedicated analog sensors, or a hardware shield. The sensitive information is one or more cryptographic keys. Data sent over the secure communication interface is encrypted or digitally signed. The first CPU is unable to directly control the second CPU through the secure communication interface.

In general, another aspect of the subject matter described in this specification can be embodied in a system that includes a first central processing unit (CPU) and a second CPU. The second CPU includes a separate power source and a separate memory from the first CPU. The first CPU and the second CPU can communicate through a secure communication interface where the first CPU is unable to directly control the second CPU through the secure communication interface. In addition, the first CPU cannot access information in the separate memory.

These and other embodiments can optionally include one or more of the following features. The second CPU includes a separate clock system from the first CPU. Data sent over the secure communication interface is encrypted or digitally signed. The separate memory contains one or more cryptographic keys. The first CPU can provide encrypted information to the second CPU which the second CPU can decrypt using the one or more cryptographic keys.

In general, another aspect of the subject matter described in this specification can be embodied in a method and program product that include receiving an external communication at a first Central Processing Unit (CPU). The first CPU determines that the external communication requires manipulation of sensitive information. The secure CPU is employed by the first CPU by way of a secure communication interface to process the external communication. The secure CPU is configured to perform tasks that manipulate the sensitive information.

These and other embodiments can optionally include one or more of the following features. The secure CPU includes one or more of: a separate power source from the first CPU, a separate clock system from the first CPU, a separate program and data memory from the first CPU, dedicated analog sensors, or a hardware shield. The sensitive information is one or more cryptographic keys. Data sent over the secure communication interface is encrypted or digitally signed. The first CPU is unable to directly control the secure CPU through the secure communication interface.

Particular embodiments of the subject matter described in this specification can be implemented to realize one or more of the following advantages. Non-secure applications can be implemented on a master CPU and secure applications can be implemented on a secure slave CPU. In this way, the various applications embedded in the master CPU are not required to implement the slave functionality. Hardware measures against hacker attacks do not need to be implemented in the master CPU. The master CPU, which could be subject to hacker attacks, has no direct access to the slave CPU except through a secure interface. The master CPU will have no access to the data, processing methods or software algorithms on the slave CPU. The slave CPU includes a hardware shield to protect against hacking attacks. Data exchange between the master CPU and the slave CPU is managed through the secure interface. Data sent over the secure interface can be encrypted, signed or both.

The details of one or more embodiments are set forth in the accompanying drawings and the description below. Other features, aspects, and advantages will become apparent from the description, the drawings, and the claims.

BRIEF DESCRIPTION OF THE DRAWINGS

Like reference symbols in the various drawings indicate like elements.

DETAILED DESCRIPTION

Figure 1:
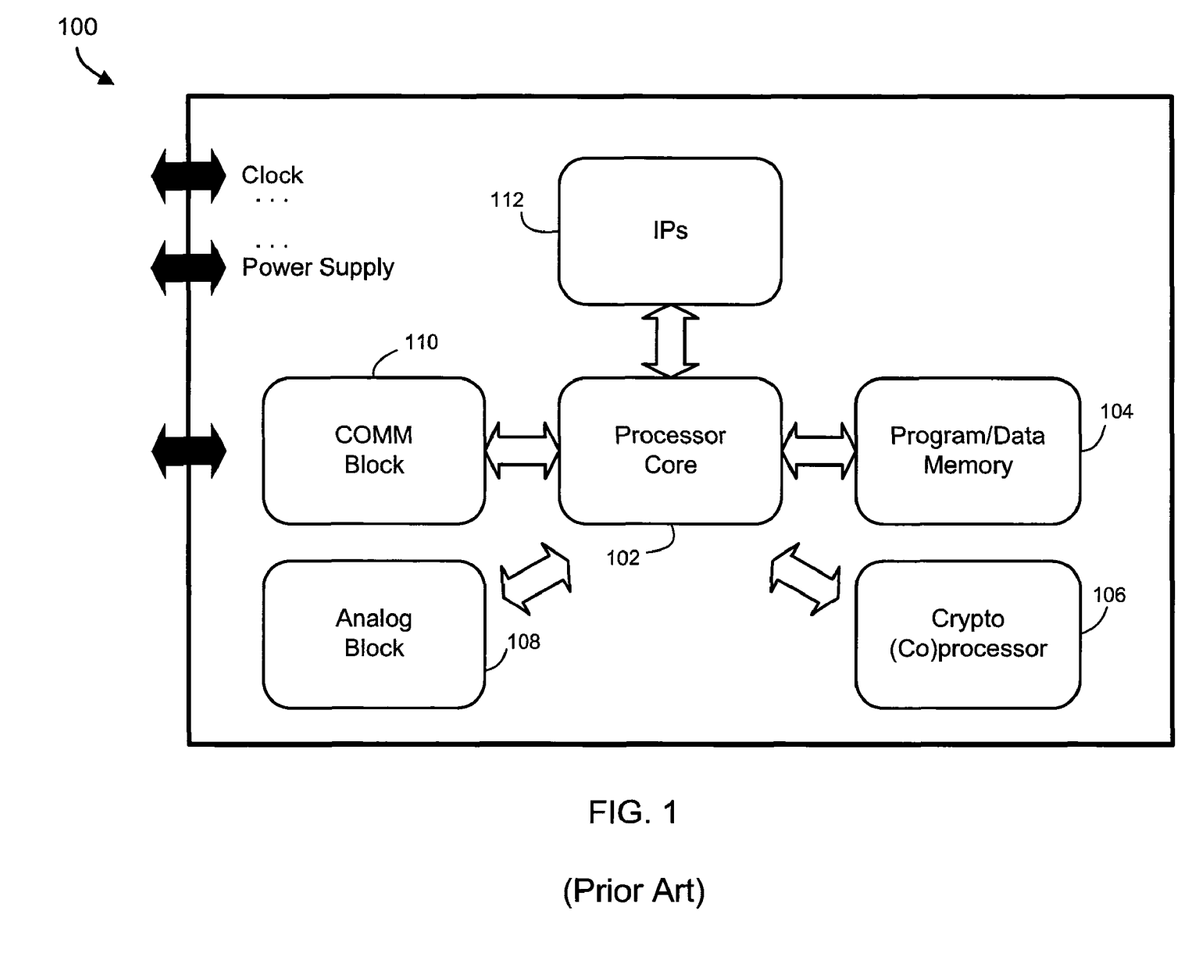
FIG. 1 shows an example of a prior art mono-processor system for a smart card.

FIG. 1 shows an example of a prior art mono-processor system 100 for a smart card. Such systems are subject to attacks as described above with the intent of obtaining sensitive information. Sensitive information can include data (e.g., cryptographic keys), program instructions, or combinations of these. A mono-processor system 100 typically includes a microprocessor core 102 which can include a memory protection unit (MPU), program and data memories 104 (e.g., random access memory, non-volatile memory, and read-only memory), and a cryptographic processor or accelerator 106. An analog block 108 can include general analog hacker safeguards such as a frequency monitor, a power supply monitor, a temperature sensor, and a voltage regulator. A communication block 110 is responsible for data transfer between the mono-processor system 100 and the external world (e.g., set-top boxes and cellular telephones). The mono-processor system 100 can also include intrusion prevention systems (IPs) 112 to detect various hacking techniques so that the mono-processor system 100 can take counter measures.

In the mono-processor system 100, the processor core 102 performs tasks that manipulate sensitive information such as cryptographic keys for data encryption and decryption along with tasks that do not involve the use of sensitive information, such as data exchange with the external world. This creates a vulnerability whereby sensitive information can be obtained from the mono-processor system 100 using, for instance, fault injection techniques to change the behavior of the mono-processor system 100. However, this vulnerability can be eliminated through the use of a two CPU "bi-processor" system that maintains sensitive information on a secure slave CPU protected by a hardware shield.

Figure 2:
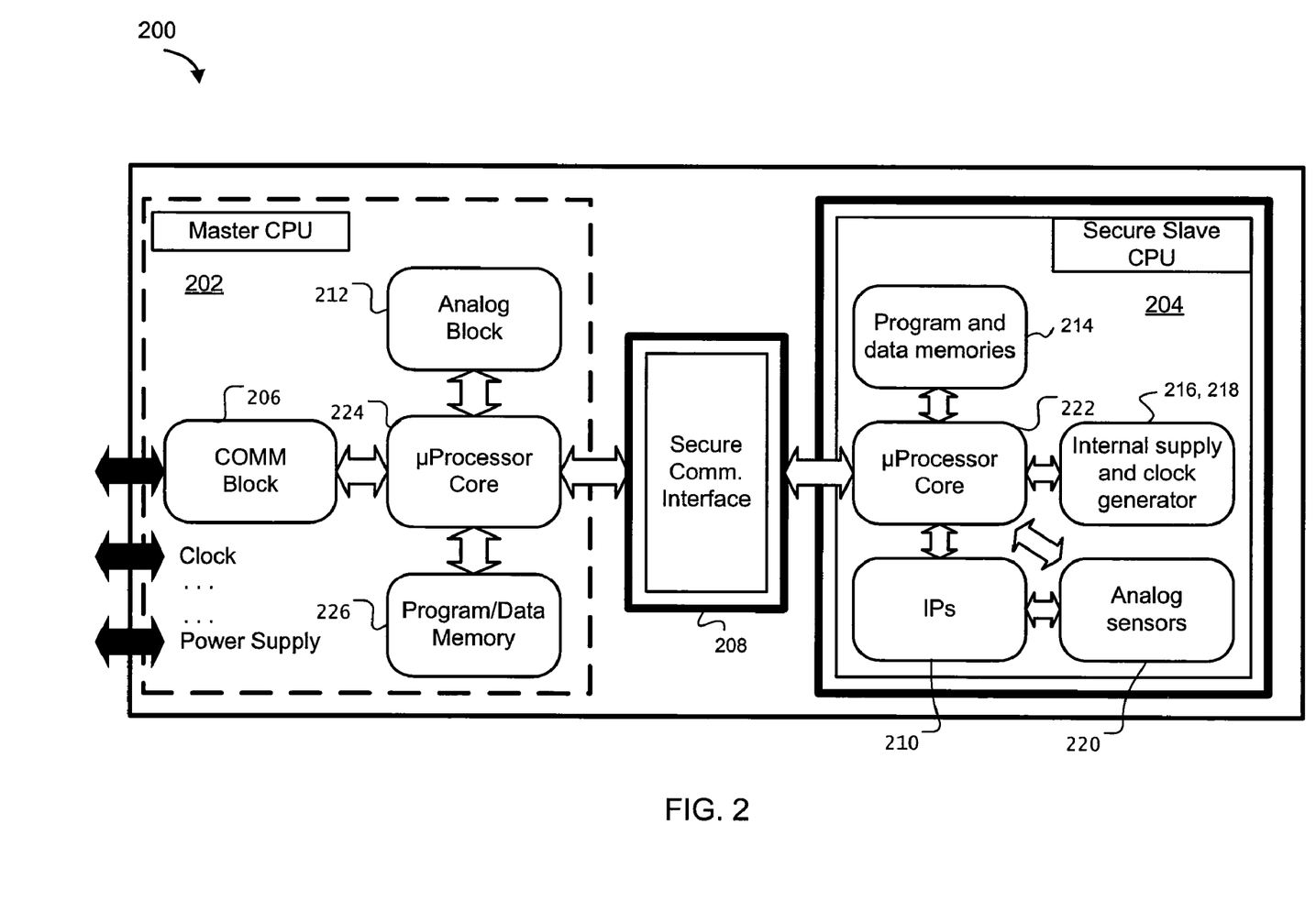
FIG. 2 shows an example of a secure, bi-processor system for a smart card or other device.

FIG. 2 shows an example of a bi-processor system 200 for a smart card or other device. The system 200 includes a master CPU 202 and a secure slave CPU 204. The master CPU 202 is used perform tasks that do not require sensitive information such as data transfer with an external system through a communication block 206, whereas the slave CPU 204 is used to perform tasks that manipulate sensitive information. In some implementations, the master CPU 202 is in charge of processing external requests received through the communication block 206 and assigning resulting tasks involving manipulation of sensitive information to the slave CPU 204 by way of a secure communication interface 208. In some implementations, the master CPU 202, the secure slave CPU 204, or both, include intrusion prevention systems 210 that can be customized to specific applications. An analog block 212 can include general analog hacker safeguards such as a frequency monitor, a power supply monitor, a temperature sensor, and a voltage regulator. Each CPU also includes one or more microprocessor cores (e.g., 224, 222) and program and data memories (e.g., 226, 214).

The slave CPU 204, which handles sensitive information, is protected by a hardware shield that encompasses protections that isolate the slave CPU 204 from the master CPU 202 or from the external world. The hardware protections can include, but are not limited to, those listed in TABLE 1 below.

TABLE 1

| HARDWARE PROTECTION | DESCRIPTION |
| --- | --- |
| Separate Power Supply | A separate power supply 216 provides galvanic isolation from the external power supply but also from the master CPU 202 and the remainder of the chip power supply. The separate power supply 216 prevents power glitches applied on an external pin from propagating to the slave CPU 204. |
| Separate Clock System | A separate clock system 218 prevents clock glitches from propagating to the slave CPU 204 and allows the slave CPU 204 to participate in anti differential power analysis counter measures. |

TABLE 1-continued

| HARDWARE PROTECTION | DESCRIPTION |
|---|---|
| Separate Program and Data memories | Separate program and data memories 214 in the slave CPU 204 prevent the master CPU 202 from reading or modifying sensitive information on the slave CPU 204 directly or when under attack. In some implementations, the memories 214 can include parity bits which allow for the detection of fault injection attacks on the memories. |
| Dedicated analog sensors | Dedicated analog sensors 220 monitor the slave CPU 204's environmental conditions for signs of attack. |
| Physical hardware shield | A physical shield (e.g., a metalic cover) enclosing the slave CPU 204 and, optionally, the master CPU 202, can reduce the likelihood that a hacker will gain access to internal signals or subject the slave CPU 204 to various kinds of radiation in an attempt to corrupt sensitive information. |

Data exchange between the master CPU 202 and the slave CPU 204 is managed through the secure interface 208. The master CPU 202 can place processing requests for the slave CPU 204 by way of the secure interface 208. Such requests can be received "as is" from the external world and the master CPU 202 would in this case be used as a simple mailbox. In some implementations, the master CPU 202 has no access to processing methods or information within the secure slave CPU 204. The slave CPU 204 processes the request and transfers results (if any) to the master CPU 202 through the secure interface 208.

In some implementations, the secure interface can also feature processing status registers, control registers, or combinations of these. To prevent the secure slave CPU 204 from being vulnerable to hacker attacks through these registers, in some implementations the read/write access to these registers is defined such that any link between the two processors only serves the purpose of exchanging input data and output results. In these implementations, the master CPU 202 is not capable of controlling the slave CPU 204 through the registers. In some implementations, the interaction between the processors is strictly limited to transmitting information to be processed and getting the result back.

In some implementations, a secure communication protocol is implemented to guarantee a secure digital dialog between the master CPU 202 and the slave CPU 204 over the secure interface 208. In further implementations, data sent by the master CPU 202 to the slave CPU 204 through the secure interface 208 is digitally signed to allow the slave CPU 204 to verify the integrity of the data before processing the data. Moreover, data sent by the slave CPU 204 to the master CPU 202 can likewise be digitally signed. In some implementations, a request from the master CPU 202 to the slave CPU 204 is encrypted with keys known by the slave CPU 204. Similarly, responses to requests can be digitally signed, encrypted or both and returned to the Master CPU for transmission to the external world such that the master CPU 202 acts as a passive conduit between the slave CPU 204 and the external world.

Figure 3A:
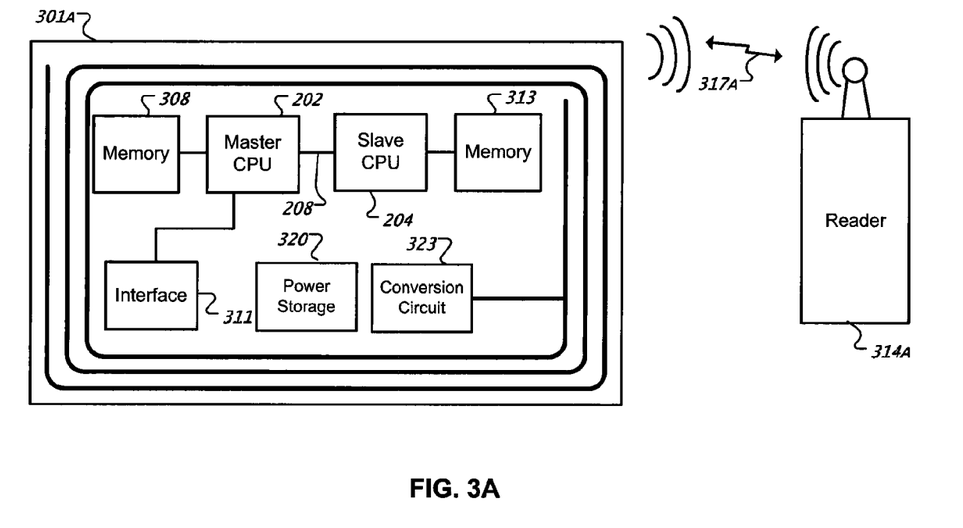
FIGS. 3A and 3B are block diagrams of example smart cards that can be used with the bi-processor system.
Figure 3B:
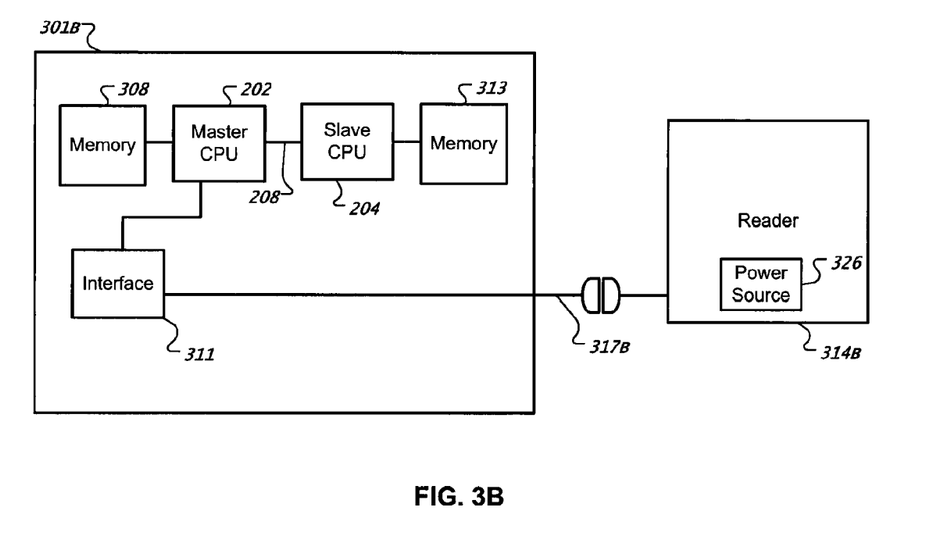

FIGS. 3A and 3B are block diagrams of example smart cards 301A and 301B that can be used to implement bi-processor system 200. As shown, each example smart card 301A or 301B includes a master CPU 202, a slave CPU 204 and a secure communication interface 208 between the two. Each CPU has its own memory. The master CPU 202 has a memory 308 and the slave CPU 204 has a memory 313. The master CPU 202 cannot access the slave CPU 204 memory 313. Memories 308 and 313 can represent multiple different kinds of memory, such as, for example, ROM or RAM, flash, DRAM, SRAM, etc. For example, in some implementations, program instructions for the master CPU 202 are stored on ROM, and the master CPU 202 uses some form of RAM to store intermediate data as the programming instructions are executed.

The interface 311 provides a means for the smart cards 301A or 301B to interact with external systems, such as, for example, a smart card reader 314A or 314B. In some implementations, the interface 311 works in conjunction with a wireless communication channel 317A that includes, for example, RF (radio frequency) signals that are adapted for a particular communication protocol (e.g., a protocol characterized by ISO/IEC 14443 or ISO 15693 (ISO refers to the International Organization for Standardization; IEC refers to the International Electrotechnical Commission)). In some implementations, the interface 311 works in conjunction with a wired communication channel 317B that is adapted for a particular communication protocol (e.g., a protocol characterized by ISO/IEC 7816 or ISO/IEC 7810)).

The smart cards 301A or 301B are powered by a power source. For example, the smart card 301A can be powered by an integrated power storage device 320, such as a battery or low-loss capacitor. As another example, the smart card 301A can be powered by an antenna and conversion circuit 323 that receives RF signals and converts energy in the RF signals to electrical energy that can be used to power the components of the smart card 301A. As another example, the smart card 301B can be powered by a source that is external to the smart card itself, such as a power supply 326 that is integrated in a corresponding smart card reader 314B.

In operation, the smart card reader 314A or 314B can request protected information from the smart card 301A or 301B, respectively. In some implementations, the smart card reader 314A or 314B provides an encryption key for the smart card 301A or 301B to use in encrypting the protected information before transmitting it to the reader 314A or 314B. In some implementations, the protected information is already stored in encrypted form, and the smart card reader 314A or 314B provides a decryption key to decrypt the protected information before providing it to the reader 314A or 314B. In some implementations, the smart card 301A or 301B performs other operations on the protected information. Smart cards can also include other intrusion prevention systems such as timers, cryptography processors, cryptography accelerators, etc.

Figure 4:
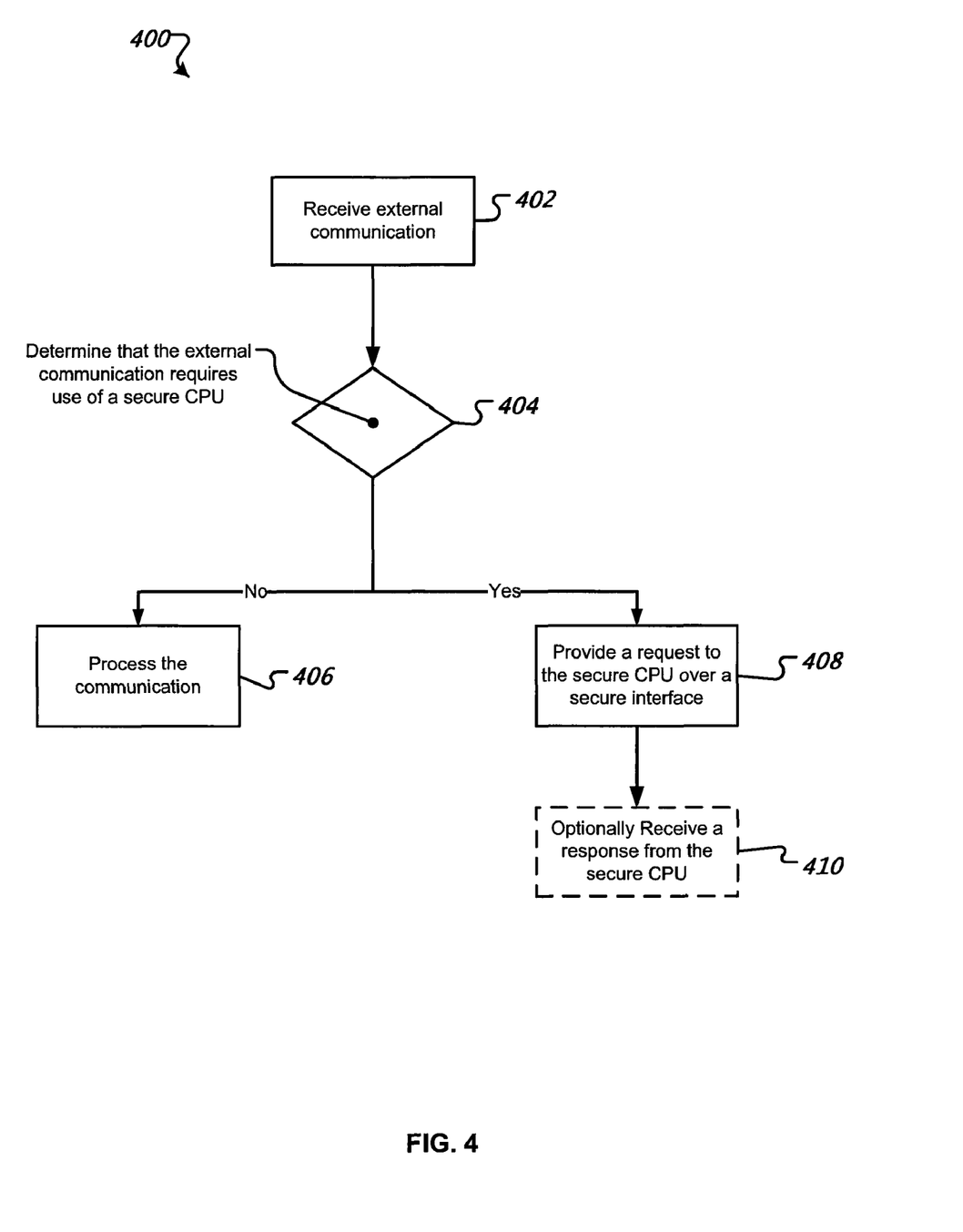
FIG. 4 is a flow chart of a process for communicating with a slave CPU.

FIG. 4 is a flow chart of a process 400 for communicating with a slave CPU. A master CPU (e.g., 202) receives an external communication from a communication block (e.g., 206; step 402). The master CPU determines whether or not the external communication requires use of a secure CPU (e.g., 204), such as when sensitive information must be manipulated (step 404). For example, if the external communication is encrypted, the master CPU can assume that the secure CPU can decrypt and process the communication. If the communication does not require the secure CPU, the master CPU processes the communication (step 406). Otherwise, a request is provided to the secure CPU over a secure interface (e.g., 208) for the secure CPU to process the external communication or perform some task based on the external communication (step 408). An optional response is received from the secure CPU (step 410) which can be further processed by the master CPU or provided in some form to the external world through the communication block.

Embodiments of the subject matter and the functional operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer program products, i.e., one or more modules of computer program instructions encoded on a computer-readable medium for execution by, or to control the operation of, data processing apparatus. The computer-readable medium can be a machine-readable storage device, a machine-readable storage substrate, a memory device, a composition of matter effecting a machine-readable propagated signal, or a combination of one or more of them.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio player, a Global Positioning System (GPS) receiver, to name just a few.

Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

While this specification contains many specifics, these should not be construed as limitations on the scope of the invention or of what can be claimed, but rather as descriptions of features specific to particular embodiments. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features can be described above as acting in certain combinations and even initially claimed as such, one or more features from a claimed combination can in some cases be excised from the combination, and the claimed combination can be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing can be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments have been described. Other embodiments are within the scope of the following claims. For example, the actions recited in the claims can be performed in a different order and still achieve desirable results.

What is claimed is:

1. A system comprising:
a first central processing unit (CPU) configured to perform tasks that do not require manipulation of sensitive information;
a second CPU configured to perform tasks that manipulate the sensitive information on behalf of the first CPU;
a secure communication interface through which the first CPU and the second CPU communicate; and
where the first CPU cannot access the sensitive information within the second CPU and the first CPU has no access to processing methods within the second CPU through the secure communication interface.

2. The system of claim 1 where the second CPU includes one or more of:
a separate power source from the first CPU, a separate clock system from the first CPU, a separate program and data memory from the first CPU, dedicated analog sensors, or a hardware shield.

3. The system of claim 1 where:
the sensitive information is one or more cryptographic keys.

4. The system of claim 1 where:
data sent over the secure communication interface is encrypted or digitally signed.

5. The system of claim 1 where:
the first CPU is unable to directly control the second CPU through the secure communication interface.

6. A system comprising:
a first central processing unit (CPU);
a second CPU where the second CPU includes a separate power source and a separate memory from the first CPU;
a secure communication interface through which the first CPU and the second CPU communicate where the first CPU has no access to processing methods within the second CPU through the secure communication interface; and
where the first CPU cannot access information in the separate memory.

7. The system of claim 6 where the second CPU includes:
a separate clock system from the first CPU.

8. The system of claim 6 where:
data sent over the secure communication interface is encrypted or digitally signed.

9. The system of claim 6 where:
the separate memory contains one or more cryptographic keys.

10. The system of claim 9 where:
the first CPU can provide encrypted information to the second CPU which the second CPU can decrypt using the one or more cryptographic keys.

11. A method comprising:
receiving an external communication at a first Central Processing Unit (CPU);
determining by the first CPU that the external communication requires manipulation of sensitive information; and
employing a secure CPU by the first CPU by way of a secure communication interface to process the external communication, where the first CPU has no access to processing methods within the secure CPU through the secure communication interface.

12. The method of claim 11 where the secure CPU includes one or more of:
a separate power source from the first CPU, a separate clock system from the first CPU, a separate program and data memory from the first CPU, dedicated analog sensors, or a hardware shield.

13. The method of claim 11 where:
the sensitive information is one or more cryptographic keys.

14. The method of claim 11 where:
data sent over the secure communication interface is encrypted or digitally signed.

15. The method of claim 11 where:
the first CPU is unable to directly control the secure CPU through the secure communication interface.

16. A computer program product, encoded on a non-transitory computer-readable medium, operable to cause data processing apparatus to perform operations comprising:
receiving an external communication at a first Central Processing Unit (CPU);
determining by the first CPU that the external communication requires manipulation of sensitive information; and
employing a secure CPU by the first CPU by way of a secure communication interface to process the external communication, where the first CPU has no access to processing methods in the secure CPU through the secure communication interface.

17. The computer program product of claim 16 where the secure CPU includes one or more of:
a separate power source from the first CPU, a separate clock system from the first CPU, a separate program and data memory from the first CPU, dedicated analog sensors, or a hardware shield.

18. The computer program product of claim 16 where:
the sensitive information is one or more cryptographic keys.

19. The computer program product of claim 16 where:
data sent over the secure communication interface is encrypted or digitally signed.

20. The computer program product of claim 16 where:
the first CPU is unable to control the secure CPU through the secure communication interface.

* * * * *